Feb. 7, 1961 H. R. MEISEL ET AL 2,971,138

CIRCUIT MICROELEMENT

Filed May 18, 1959 2 Sheets-Sheet 1

INVENTORS
HERBERT R. MEISEL,
ADAM PIKOR,
LEONARD SCHORK &
BY ADOLPH BLICHER

W.S. Hiel

AGENT

Feb. 7, 1961 H. R. MEISEL ET AL 2,971,138

CIRCUIT MICROELEMENT

Filed May 18, 1959 2 Sheets-Sheet 2

INVENTORS
HERBERT R. MEISEL,
ADAM PIKOR,
LEONARD SCHORK &
BY ADOLPH BLICHER

W. S. Hill

AGENT

United States Patent Office 2,971,138

Patented Feb. 7, 1961

2,971,138

CIRCUIT MICROELEMENT

Herbert R. Meisel, Irvington, Leonard Schork, Westfield, Adam Pikor, Summit, and Adolph Blicher, North Plainfield, N.J., assignors to Radio Corporation of America, a corporation of Delaware Filed May 18, 1959, Ser. No. 814,026

20 Claims. (Cl. 317—234)

Figures 1A, 1B, 1C, 1D:
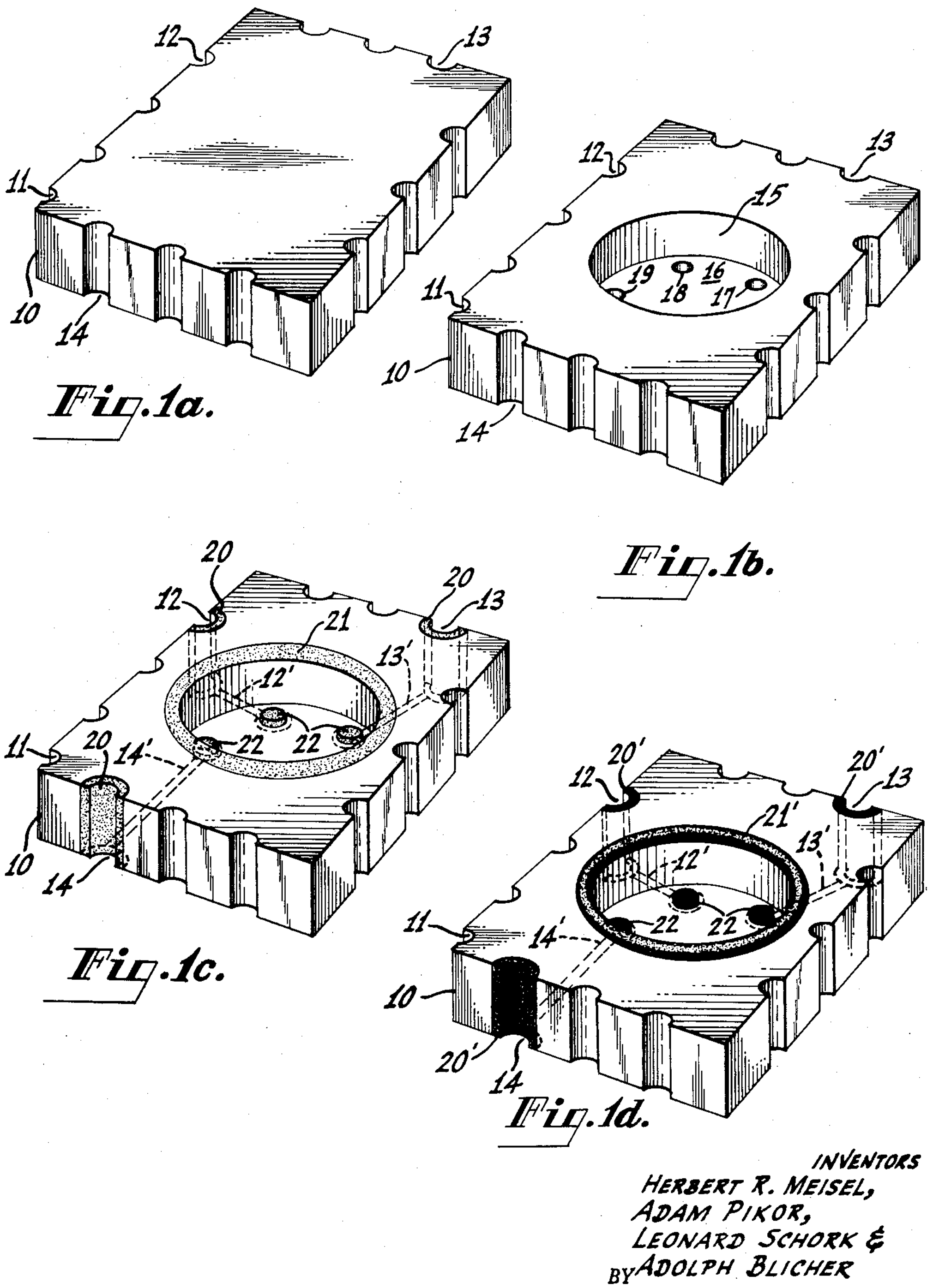

This invention relates to electronic apparatus, and more particularly to components such as microelements useful in the manufacture and assembly thereof.

It has been proposed to fabricate different electronic components in the same standard size, with compatible connecting means and a uniform shape suitable for rapid assembly, as by stacking. A single such component is denoted herein as a microelement. The composite units or circuit elements formed by connecting a group of microelements are known as modules. By arranging a series of different modules in the desired order, it is possible to provide a great number of different devices or subassemblies. Each individual microelement may for example, consist of a ceramic wafer having a single circuit function, such as a capacitor, a resistor, or an inductance. The module then consists of a plurality of such microelements, which may be stacked together in the desired order, as in the "Tinker Toy" units developed at the United States Bureau of Standards and described in U.S. 2,771,663 and 2,774,014. Such modules are capable of being fabricated and assembled by high speed automatic machinery, thus simultaneously providing the advantages of low cost manufacture and assembly with the advantages of low unit weight and unit volume.

The value of this type of construction for electronic apparatus is obvious, particularly in applications where it is desirable to reduce the weight and volume of electronic gear. Thus it is estimated that each pound of dead weight in a military fighter aircraft causes a cost increase of about forty-two hundred dollars, while, in long range missiles, the cost penalty for each pound of added weight is much greater. Nevertheless, such construction has not been widely adopted by the industry. One reason for this is that such modules were originally intended to operate with miniature vacuum tubes, and hence did not take advantage of the design possibilities inherent in the substitution of semiconductor devices such as diodes and transistors for vacuum tubes. The conventional methods of casing semiconductor devices by hermetically sealing them in glass tubes or metal cans result in units which are wasteful of space and are too thick for compatibility with this type of modular construction.

It is therefore an object of this invention to provide an improved electronic circuit microelement of the character described.

Another object of the invention is to provide an improved microelement including a semiconductor crystal.

Yet another object is to provide an improved transistor microelement which may be readily and economically fabricated by automatic machinery.

But another object is the provision of an improved transistor microelement which may be rapidly assembled into compact devices by automatic machinery.

These and other objects are accomplished by the instant invention, which provides an improved electronic circuit microelement comprising an insulating wafer bearing a recess in one major face, and a plurality of apertures through the wafer disposed in the recess floor. Conducting means extend through each aperture. In one embodiment, each aperture is sealed by means of a conductive plug, such as formed by a fusible metal or alloy. On the one major wafer face a sealable area or portion is provided around the recess. A semiconductor crystal containing at least one rectifying barrier therein is disposed within the recess and bonded directly to one conducting means or conductive plug. In an alternate embodiment, the semiconductor crystal is mounted on a tab which is bonded to the conductive plug. At least one electrical connection is made between a region of the crystal and another of said conducting means. The microelement is completed by hermetically sealing closure means such as a metal plate to the sealable portion around the recess.

Figure 2:
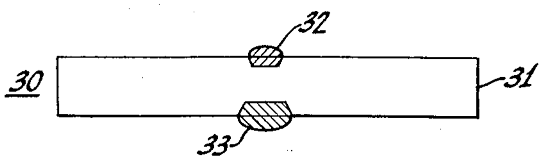
Figure 3:
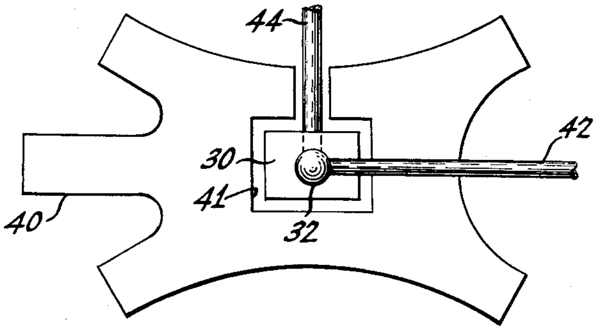

The invention will be described in greater detail in connection with the accompanying drawing, in which:

Figures 1*a*–1*f* are perspective views of successive steps in the fabrication of a semiconductive microelement in accordance with one embodiment of the invention;

Figure 2 is a cross-sectional view on an enlarged scale of the transistor assembly utilized in the above embodiment; and, Figure 3 is a plan view of a tab useful for mounting the semiconductor wafer in the above embodiment.

The invention and its features will be best understood by consideration of a specific embodiment thereof. The example described below and illustrated in Figure 1 relates to the fabrication of a microelement including a surface alloyed transistor of the triode type, but it will be understood that other transistor types such as grown junction units, melt quench units, surface barrier units, diffused junction mesa units, and tetrodes may be similarly utilized, as well as conventional diodes, PNPN diodes, and the like.

Figure 1*a* shows the basic shape of each microelement in accordance with the standard selected for the instant modular system. The microelement is made of a wafer 10 of an insulating material, which may, for example, be a ceramic such as alumina, steatite, and the like, or a photosensitive lithium silicate commercially available as Corning Fotoceram. The wafer material is preferably one which is mechanically strong, a good insulator, impervious to moisture and vapors, and a good heat conductor in order to dissipate the heat generated by operation of the unit. Pure alumina and the so-called high density alumina ceramics, which contain over 95% $Al_2O_3$, have been found particularly suitable for this purpose, and both are denominated hereafter under a common or generic description as "alumina." In this example, the microelement is formed of a square alumina wafer 10 which is 25 mils thick and 310 mils on edge. Wafer 10 is provided with three terminating notches on each edge, making a total of twelve terminating notches. Three of these notches are of interest in this embodiment, and are labeled 12, 13 and 14 respectively, but it will be clear that the selection is arbitrary, and any of the other terminating notches may be utilized if desired. In addition to the twelve terminating notches described above, there is one smaller indexing notch 11 near one corner of wafer 10. The indexing notch 11 serves to orient the wafer 10.

A wafer 10 is prepared with a recess 15 in one major wafer face, as shown in Figure 1*b*. In this example, the recess is generally circular, centered in the wafer face, has a diameter of 170 mils and a depth of 17 mils. The recess floor 16 is generally flat. A plurality of holes or apertures through the wafer are formed in the recess floor 16. In this example, at least three apertures denoted 17, 18 and 19 respectively are made, each aperture having a diameter of 20 mils. The apertures may be spaced as required. In the modification illustrated, the three apertures are near the periphery of recess 15, apertures 17 and 19 being spaced 90 degrees in opposite directions around the periphery from aperture 18. When Fotoceram wafers are used, the recess and the three apertures may be made by selective etching, while in alumina wafers, the recess and apertures may be prepared by molding or pressing the powdered material, and subsequently grinding after firing.

Referring now to Figure 1*c*, a metal strike or film 20 is prepared on preselected portions of wafer 10. The preselected portions include the interiors of notches 12, 13 and 14; a small region around each of these notches; a generally circular zone 21 on the one major wafer face around recess 15; and three regions or zones on the opposite major wafer face, one of which 13' connects aperture 17 and notch 13, another 12' connects aperture 18 and notch 12, and the last 14' connects aperture 19 and notch 14 respectively. These regions are indicated by dotted lines in the figure.

The strike is made by applying a curable metal paste to the desired portions of the wafer and then heating the wafer to a temperature which cures the paste. The paste contains a powdered noble metal such as silver, gold, or platinum, together with glass frit, and is applied by brushing or silk screening after the wafers have been scrupulously cleaned. Platinum compositions have been found particularly suitable for both alumina and Fotoceram wafers. Hanovia platinum alloy 130A–New is preferred for brushing, while Hanovia platinum alloy 13A is preferred for silk screening. The wafer is fired for about 15 minutes on each side in a furnace maintained at 840° C. to cure the paste. A very thin gray platinum film or strike is thereby formed on the preselected portions and zone 21 of the wafer.

The apertures 17, 18 and 19 are now filled with a conductive metal plug. This may be accomplished by forcing a gout of molten lead or solder under pressure into each aperture. In this embodiment an alternative method is utilized in which a small flat-headed nickel brad 22 is inserted in each aperture with the head resting on recess floor 16. In this example, each brad 22 is 14 mils in diameter, 11 mils long, and has a flat head 24 mils in diameter.

The wafer 10 is first dipped in a zinc chloride-ammonium chloride flux and next dipped in a molten metal such as tin or lead or a fusible alloy such as solder. During this dip soldering the head of each brad is covered by a ceramic washer (not shown) which is subsequently removed. In this example, wafer 10 is dipped in a molten solder consisting of 38 parts lead, 60 parts tin, and 2 parts silver by weight. The previously platinized portions of the wafer surface are thereby covered with a uniform coating of solder 20' and 21' as shown in Figure 1*d*. Examination under the microscope reveals that this deposit is remarkably uniform, owing to the high surface tension of the solder. For example, the cross-section of the solder deposit on the circular sealable zone 21 is uniformly hemispherical throughout. During the same step solder enters each of apertures 17, 18 and 19 from below, and hermetically seals each nickel brad 22 in its respective aperture.

Figures 1E, 1F:
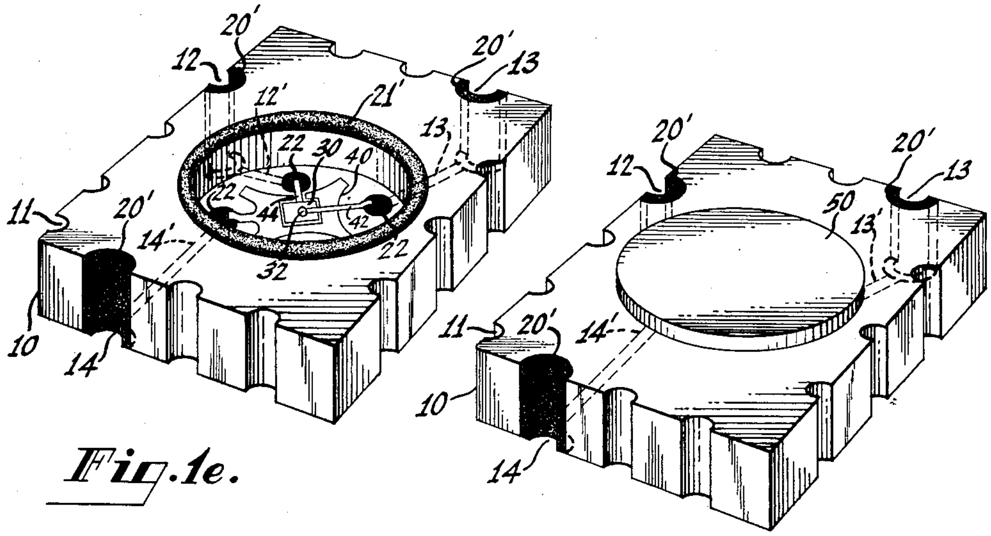

Referring now to Figure 1*e*, a previously prepared semiconductor device is inserted in the wafer recess and attached to the brad head or conductive plug 22 in one aperture. In this example, the semiconductor device is a transistor assembly 30 as shown in Figure 2. The term "transistor assembly" is used herein to denote a monocrystalline semiconductive chip or wafer containing emitter, base and collector regions, but without any leads attached thereto. In this example, transistor assembly 30 consists of an N-type monocrystalline germanium wafer 31 having rectifying electrode pellets 32 and 33 alloyed to opposite major faces thereof. The electrode pellets 32 and 33 contain an acceptor material, and in this example are composed of indium. Germanium wafer 31 is about 50 mils square and 3 mils thick. Wafer 31 may be soldered directly to one conductive plug, utilizing a solder which is either electrically inert or contains a donor material. However, in the embodiment of Figure 1 the semiconductor wafer 31 is first mounted on a base tab by soldering the germanium wafer to a recess 41 in a slotted tab 40, as shown in Figure 3. Tab 40 is conveniently made of nickel or Kovar. Electrode pellet 33 projects below through an aperture in the tab recess 41. A lead wire 42 is bonded to indium pellet 32 by heating pellet and wire in a hot hydrogen jet. Lead wire 42 is in the same plane as tab 40. Similar lead wire 44 is bonded to electrode pellet 33 in the same manner. Lead wire 44 passes through the slot of base tab 40, and is in the same plane as lead wire 42, but at right angles to it. In this example, lead wires 42 and 44 are 3 mils in diameter and composed of nickel plated with indium-cadium alloy.

The base tab 40 is now inserted in wafer recess 15 and spot welded to the conductive plug closest to notch 14, as shown in Figure 1*e*. Lead wire 42 is then spot welded to the plug next to notch 13, and lead wire 44 to the conductive plug adjacent notch 12.

The last step shown in Figure 1*f* consists of hermetically sealing the microelement. A suitable potting compound is placed around the germanium wafer 31, and the unit is baked for 2 hours at 105° C. In this example, the potting compound is a thermally conducting silicone grease comprising a dimethyl silicone polymer containing a filler of powdered alumina. A metal plate 50 is then hermetically sealed to the sealable wafer portion 21' around the recess. In this example, plate 50 is a flat brass disc 3 mils thick and about 230 mils in diameter. Sealing is accomplished without the use of a flux, which would generally leave harmful residues. A combination of heat (240° C.) and pressure (5 to 10 lbs./in.$^2$ for 5 seconds) is used to seal brass plate 50 to the sealable zone 20' of the microelement. These temperatures and pressures are suitable for fusible sealable materials such as lead or solder.

In the transistor microelement thus prepared, contact to the base region of the transistor is made by means of notch 14, contact to the emitter region by means of notch 13, and contact to the collector region by means of notch 12. It will be understood that the above example is but illustrative, and many other modifications and embodiments of semiconductor circuit micro-elements may be made without departing from the spirit and scope of the instant invention. For example, other configurations may be selected for the recess, the apertures and the terminating notches. Different insulating materials, such as beryllium oxide, may be utilized as a base for the microelement. Many other techniques are known for making a metallic strike on ceramic or Fotoceram surfaces, and any convenient process may be utilized. Diodes, tetrodes, and other transistor types may be similarly utilized in the microelement instead of the surface alloyed triode illustrated above. Instead of a flat metal plate, the device may be sealed by means of a plate having a peripheral flange which forms a tight fit around the edge of the recess.

There have thus been described improved semiconductive microelements and improved methods of fabricating the same.

What is claimed is:

1. An electronic microelement comprising an insulating wafer bearing a recess in one major face, a hermetically sealable portion on said one major wafer face around said recess, a plurality of spaced apertures through said wafer within said recess, conducting means extending through each of said apertures, a semiconductor crystal within said recess attached to one of said conducting means, at least one electrical connection between said crystal and another of said conducting means, and a closure means hermetically sealed to said sealable portion of said one wafer face.

2. An electronic microelement comprising a ceramic wafer bearing a recess in one major face, a hermetically sealable portion on said one major wafer face around said recess, a plurality of spaced apertures through said wafer within said recess, a conductive plug in each of said apertures, a semiconductor crystal within said recess attached to one said plug, at least one electrical connection between said crystal and another of said plugs, and a metal plate hermetically sealed to said sealable portion of said one wafer face.

3. An electronic microelement comprising a photosensitive lithium silicate wafer bearing a recess in one major face, a hermetically sealable portion on said one major wafer face around said recess, a plurality of spaced apertures through said wafer within said recess, a conductive plug in each of said apertures, a semiconductor crystal within said recess attached to one said plug, at least one electrical connection between said crystal and another of said plugs, and a metal plate hermetically sealed to said sealable portion of said one wafer face.

4. An electronic microelement comprising an insulating wafer bearing a recess in one major face, a hermetically sealable portion on said one wafer face around said recess, a plurality of spaced apertures through said wafer within said recess, a conductive plug in each of said apertures, a transistor assembly within said recess attached to a first said plug, a first electrical connection between said assembly and a second said plug, a second electrical connection between said assembly and a third said plug, and a metal plate hermetically sealed to said sealable portion of said one wafer face.

5. An electronic microelement comprising a ceramic wafer bearing a recess in one major face, a hermetically sealable portion on said one wafer face around said recess, a plurality of spaced apertures through said wafer within said recess, a conductive plug in each of said apertures, a transistor assembly within said recess attached to a first said plug, a first electrical connection between said assembly and a second said plug, a second electrical connection between said assembly and a third said plug, and a metal plate hermetically sealed to said sealable portion of said one wafer face.

6. An electronic microelement comprising a photosensitive lithium silicate wafer bearing a recess in one major face, a hermetically sealable portion on said one wafer face around said recess, a plurality of spaced apertures through said wafer within said recess, a conductive plug in each of said apertures, a transistor assembly within said recess attached to a first said plug, a first electrical connection between said assembly and a second said plug, a second electrical connection between said assembly and a third said plug, and a metal plate hermetically sealed to said sealable portion of said one wafer face.

7. An electronic microelement comprising an insulating wafer bearing a recess on one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, connecting means between one said electrode and a second said plug, connecting means between the other said electrode and a third said plug, and a metal plate hermetically sealed to said sealable portion of said one major face.

8. An electronic microelement comprising a ceramic wafer bearing a recess on one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, connecting means between one said electrode and a second said plug, connecting means between the other said electrode and a third said plug, and a metal plate hermetically sealed to said sealable portion of said one major face.

9. An electronic microelement comprising an alumina wafer bearing a recess on one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, connecting means between one said electrode and a second said plug, connecting means between the other said electrode and a third said plug, and a metal plate hermetically sealed to said sealable portion of said one major face.

10. An electronic microelement comprising a photosensitive lithium silicate wafer bearing a recess on one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, connecting means between one said electrode and a second said plug, connecting means between the other said electrode and a third said plug, and a metal plate hermetically sealed to said sealable portion of said one major face.

11. An electronic circuit microelement comprising an insulating wafer bearing a recess in one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, a first lead between one said electrode and a second said plug, a second lead between the other said electrode and a third said plug, and a metal plate hermetically sealed to said sealable portion of said one major face.

12. An electronic circuit microelement comprising a ceramic wafer bearing a recess in one major face, a hermetically sealable portion on said one wafer face around said recess, at least three spaced apertures through said wafer within said recess, a conductive plug in each of said apertures, a semiconductive crystal attached to one said plug, two rectifying electrodes fused to opposite surfaces of said crystal, a first lead wire between one said electrode and a second said plug, a second lead wire between the other said electrode and a third said plug, and a metal plate hermetically sealed to said sealable portion of said one major face.

13. An electronic circuit microelement comprising an insulating wafer bearing a recess in one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, a first lead wire between one said electrode and a second said plug, a second lead wire between the other said electrode and a third said plug, a metal plate hermetically sealed to said sealable portion of said one major face, and metallized conductive areas on the wafer face opposite said recess, each said conductive area connecting one of said apertures with a metallized notch on the periphery of said wafer.

14. An electronic circuit microelement comprising a ceramic wafer bearing a recess in one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, a first lead wire between one said electrode and a second said plug, a second lead wire between the other said electrode and a third said plug, a metal plate hermetically sealed to said sealable portion of said one major face, and metallized conductive areas on the wafer face opposite said recess, each said conductive area connecting one of said apertures with a metallized notch on the periphery of said wafer.

15. An electronic circuit microelement comprising an alumina wafer bearing a recess in one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, a first lead wire between one said electrode and a second said plug, a second lead wire between the other said electrode and a third said plug, a metal plate hermetically sealed to said sealable portion of said one major face, and metallized conductive areas on the wafer face opposite said recess, each said conductive area connecting one of said apertures with a metallized notch on the periphery of said wafer.

16. An electronic circuit microelement comprising a photosensitive lithium silicate wafer bearing a recess in one major face, a hermetically sealable portion on said one wafer face around said recess, at least three spaced apertures through said wafer within said recess, a conductive plug in each of said apertures, a semiconductor crystal attached to one said plug, two rectifying electrodes fused to opposite surfaces of said crystal, a first lead wire between one said electrode and a second said plug, a second lead wire between the other said electrode and a third said plug, a metal plate hermetically sealed to said sealable portion of said one major face, and metallized conductive areas on the wafer face opposite said recess, each said conductive area connecting one of said apertures with a metallized notch on the periphery of said wafer.

17. An electronic circuit microelement comprising an insulating wafer bearing a recess in one major face, a hermetically sealable portion on said one wafer face around said recess, at least three apertures through said wafer within said recess, a conductive plug in each of said apertures, a metal tab disposed within said recess and connected to a first said plug, a semiconductor crystal mounted on said tab, a first electrical connection between a portion of said crystal and a second said plug, a second electrical connection between another portion of said crystal and a third said plug, and a metal plate hermetically sealed to said sealable portion of said one major face.

18. An electronic circuit microelement comprising an insulating wafer bearing a recess in one major face, a hermetically sealable portion on said one wafer face around said recess, at least three apertures through said wafer within said recess, a conductive plug in each of said apertures, a metal tab disposed within said recess and connected to a first said plug, a semiconductor crystal mounted on said tab, a first electrical connection between a portion of said crystal and a second said plug, a second electrical connection between another portion of said crystal and a third said plug, a metal plate hermetically sealed to said sealable portion of said one major face, and metallized conductive areas on the wafer face opposite said recess, each said conductive area connecting one of said apertures with a metallized notch on the periphery of said wafer.

19. An electronic circuit microelement comprising an insulating wafer bearing a recess in one major face, a hermetically sealable portion on said one wafer face around said recess, at least three apertures through said wafer within said recess, a conductive plug in each of said apertures, a metal tab disposed within said recess and connected to a first said plug, a semiconductor crystal mounted on said tab, two rectifying electrode pellets fused to opposite surfaces of said crystal, a first lead wire between one said electrode and a second said plug, a second lead wire between the other said electrode and a third said plug, and a metal plate hermetically sealed to said sealable portion of said one major face.

20. An electronic circuit microelement comprising an insulating wafer bearing a recess in one wafer face, a hermetically sealable portion on said one wafer face around said recess, at least three apertures through said wafer within said recess, a conductive plug in each of said apertures, a metal tab disposed within said recess and connected to a first said plug, a semiconductor crystal mounted on said tab, two rectifying electrode pellets fused to opposite surfaces of said crystal, a first lead wire between one said electrode and a second said plug, a second lead wire between the other said electrode and a third said plug, a metal plate hermetically sealed to said sealable portion of said one major face, and metallized conductive areas on the wafer face opposite said recess, each said conductive area connecting one of said apertures with a metallized notch on the periphery of said wafer.

References Cited in the file of this patent

UNITED STATES PATENTS 2,804,581 Lichtgarn ______________ Aug. 27, 1957
2,881,370 Colson ________________ Apr. 7, 1959